(12) United States Patent
Amon

(10) Patent No.: US 9,225,985 B2
(45) Date of Patent: Dec. 29, 2015

(54) METHODS AND DEVICES FOR FORMING A PREDICTION VALUE

(75) Inventor: Peter Amon, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 322 days.

(21) Appl. No.: 13/979,768

(22) PCT Filed: Jan. 5, 2012

(86) PCT No.: PCT/EP2012/050133
§ 371 (c)(1),
(2), (4) Date: Jul. 15, 2013

(87) PCT Pub. No.: WO2012/095350
PCT Pub. Date: Jul. 19, 2012

(65) Prior Publication Data
US 2013/0301718 A1   Nov. 14, 2013

(30) Foreign Application Priority Data

Jan. 14, 2011  (DE) .......... 10 2011 002 732
Mar. 24, 2011 (DE) .......... 10 2011 006 036

(51) Int. Cl.
*H04N 7/12*       (2006.01)
*H04N 19/51*      (2014.01)
*H04N 19/176*     (2014.01)
(Continued)

(52) U.S. Cl.
CPC ......... *H04N 19/00587* (2013.01); *H04N 19/11* (2014.11); *H04N 19/14* (2014.11); *H04N 19/176* (2014.11); *H04N 19/182* (2014.11); *H04N 19/51* (2014.11); *H04N 19/593* (2014.11); *H04N 19/61* (2014.11)

(58) Field of Classification Search
CPC ............ H04N 19/00587; H04N 19/51; H04N 19/176; H04N 19/14; H04N 19/11; H04N 19/593; H04N 19/61; H04N 19/182
USPC ........... 375/240.12, 240.16, 240.2; 348/222.1
See application file for complete search history.

(56) References Cited

U.S. PATENT DOCUMENTS 8,442,334 B2    5/2013  Drugeon et al.
2008/0089409 A1*  4/2008  Xu et al. ............... 375/240.2
(Continued)

FOREIGN PATENT DOCUMENTS

CN      101502119    8/2009
JP      2006-005438  1/2006
(Continued)

OTHER PUBLICATIONS

German language Japanese Office Action for related Japanese Patent Application No. 2013-548798, issued Oct. 27, 2014, 4 pages.
(Continued)

*Primary Examiner* — Allen Wong
(74) *Attorney, Agent, or Firm* — Staas & Halsey LLP

(57) ABSTRACT

A method and device form a prediction value. A prediction direction is locally described by nonlinear trajectories. The prediction direction can be used in forming a prediction value to achieve a more accurate prediction determination. The method and device can be used in image compression or image-sequence compression.

12 Claims, 3 Drawing Sheets

(51) Int. Cl.
*H04N 19/61* (2014.01)
*H04N 19/593* (2014.01)
*H04N 19/11* (2014.01)
*H04N 19/14* (2014.01)
*H04N 19/182* (2014.01)

(56) References Cited

U.S. PATENT DOCUMENTS

| | | | |
|---|---|---|---|
| 2009/0196342 A1 | 8/2009 | Divorra Escoda et al. | |
| 2011/0249733 A1* | 10/2011 | Zhao et al. | 375/240.12 |
| 2012/0033096 A1* | 2/2012 | Jelinek | 348/222.1 |
| 2013/0251039 A1 | 9/2013 | Drugeon et al. | |

FOREIGN PATENT DOCUMENTS

| | | |
|---|---|---|
| JP | 2006-197575 | 7/2006 |
| JP | 2009-284275 | 12/2009 |
| WO | 2009/090884 | 7/2009 |
| WO | 2010/020592 | 2/2010 |

OTHER PUBLICATIONS

European Office Action for related European Patent Application No. 12 700 628.6, issued May 13, 2014, 5 pages.

Feng Wu et al., "Description of video coding technology proposal by Microsoft," ISO/IEC JTC1/SC29/WG11 and ITU-T SG16 WP3, Document JCTVC-A118, Dresden, Germany, Apr. 15-23, 2010, 15 pages.

Min-Koo Kang et al., "Adaptive Geometry-Based Intra Prediction for Depth Video Coding," In: Proceedings of the 2010 IEEE International Conference on Multimedia and Expo, ICME 2010, Jul. 19-23, 2010, Singapore 2010, 7 pages.

Congxia Dai et al., "Geometry-Adaptive Block Partitioning for Intra Prediction in Image & Video Coding," Image Processing, 2007. ICIP 2007. IEEE International Conference on, IEEE, PI, Sep. 1, 2007, 4 pages.

G. Laroche et al., Intra Prediction with 1D Macroblock Partitioning for Image and Video Coding, Orange-France Telecom R&D (France) and Telecom Paristech (France), Visual Communications and Image Processing, SPIE vol. 7257, Jan. 20, 2009, 9 pages.

Haitao Yang et al., "Description of video coding technology proposal by Huawei Technologies & Hisilicon Technologies," ITU-T SG16 WP3 and ISO/IEC JTC1/SC29/WG11, Document JCTVC-A118, Dresden, Germany, Apr. 15-23, 2010, 26 pages.

German Office Action for German Priority Patent Application No. 10 2011 006 036.7, issued on Oct. 6, 2011.

English language International Search Report for PCT/EP2012/050133, mailed on Feb. 29, 2012, 3 pages.

Chinese Office Action for related Chinese Patent Application No. 201280005290.8, issued Sep. 21, 2015, 6 pages.

* cited by examiner

METHODS AND DEVICES FOR FORMING A PREDICTION VALUE

CROSS REFERENCE TO RELATED APPLICATIONS

This application is based on and hereby claims priority to International Application No. PCT/EP2012/050133 filed on Jan. 5, 2012 and German Application Nos. 10 2011 002 732.7 filed on Jan. 14, 2011 and 10 2011 006 036.7 filed on Mar. 24, 2011, the contents of which are hereby incorporated by reference.

BACKGROUND

The invention relates to methods and to a device for forming a prediction value.

In image and video coding, when images of a video are compressed for example, some images in the image sequence are coded without reference to at least parts of other images. This is necessary at the beginning of an image sequence for example because at that time no previously coded image content is available as yet. It is also necessary in the case of groups of images GOPs (GOP—Group Of Pictures) which are intended to be decodable independently of one another.

Image or video coding which does not resort to image contents of an image that has already been coded in the past is referred to as intra coding. Even in the case of images which would be able to access image contents of said type it can be advantageous to perform intra coding if no good time predictor can be found in a reference frame of a previously coded image. This occurs for example at the time of scene changes or discovery of new image contents in the image.

With intra coding, however, already coded image contents of the image that is currently to be coded can be referred to for prediction purposes. This enables a decoder wanting to decode a coded or compressed image sequence to draw upon already decoded image contents and so avoid drift due to errors in decoding.

Different intra prediction directions are defined in a standard ITU H.264/AVC (ITU—International Telecommunications Union, AVC—Advanced Video Coding). FIG. 1 shows this by way of example, where the numbers 0 to 1 and 3 to 8 represent predefinable prediction directions.

FIG. 2 shows an image region composed of 5×5 pixels. In order to determine a position of the respective pixel, a coordinate system has been introduced in FIG. 2: horizontal with the values 0, 1, 2, 3, 4 and vertical with the values a, b, c, d, e. Thus, the pixel in the corner at bottom right has the position e4. In addition FIG. 2 shows a hatched image region and an unhatched image region. The hatched image region comprises only reconstructed pixels, i.e. pixels which have already been coded and decoded and therefore are available in a reconstructed form for the intra coding, such as the pixels a0 to a4, b0, c0, d0 and e0.

In contrast, the unhatched region, in this case embodied as a 4×4 block, describes a prediction image region to which e.g. the intra prediction mode 4, i.e. a diagonal prediction direction—see FIG. 1—is to be applied. The prediction is symbolized in FIG. 2 by small arrows. Thus, for example, a prediction value PRW is implemented for the pixel b1 on the basis of the reconstructed image value a0, i.e. PRW(b1)=W(a0). The image value W of a pixel, like the prediction value also, describes an amplitude value for a luminance and/or chrominance value of the respective pixel. The prediction value is then used for example as a basis for forming a difference in order to determine a differential value RES(.) for further coding of the pixel b1, such as e.g. this $$RES(b1)=W(b1)-PRW(b1)=W(b1)-W(a0).$$

In this way a respective prediction value can be calculated for all image values within the unhatched region.

In a step following the prediction the respective differential image value is quantized and coded. The coded image values result in a coded image data stream. The reconstructed image values are produced following decoding, inverse quantization of the coded image values and addition with the prediction value.

As is evident from FIG. 1 and FIG. 2, all the predictions follow linear trajectories, in FIG. 2, for example, from the reconstructed pixel a0 in a straight line to a pixel e4 that is to be predicted. Textural information that is contained within the image region that is to be predicted and that does not follow this linear prediction rule would only be predicted to an inadequate degree and result in a low compression rate or, as the case may be, poor image quality following the reconstruction.

Two similar coding modes called "line-based interprediction" are described in recently published documents "Description of Video Coding Technology Proposal by Huawei Technologies & Hisilicon Technologies" by H. Yang et al. (2010) and "Description of Video Coding Technology Proposal by Microsoft" by F. Wu et al. (2010). In said modes a weighted averaging of neighbor pixels can be employed for a pixel that is to be predicted.

SUMMARY

One possible object is to enable improved prediction.

The inventors propose a method for forming a prediction value for a first image value of a first pixel of an image on the basis of a second image value of at least one reconstructed pixel of the image, the method comprising:

forming at least one trajectory that has a third image value, an image value along the respective trajectory corresponding to the respective third image value and the respective trajectory having a shape that is not a straight line;

assigning the second image value to the respective third image value;

determining at least one of the trajectories as an auxiliary trajectory that is at a distance from a position of the first image value, the distance constituting the shortest distance to the position;

generating the prediction value on the basis of the third image value of the auxiliary trajectory.

The present method has the advantage that a more accurate prediction can be carried out on the basis of the nonlinear prediction directions taken by the respective trajectory. This results in an improvement in image quality at the same bit rate of a coded data stream or, assuming the image quality remains the same, a reduction in the bit rate or in the storage space of the coded video data stream. The reason for this improvement is to be seen in the fact that the more accurate prediction enables a more precise estimation of the prediction value of the first image value that is to be coded and as a result a smaller differential value requiring to be compressed is yielded for differential coding.

A local location of the trajectories can either be permanently predefined, for example through a selection of possible trajectory locations or shapes, or can result on the basis of already coded and reconstructed image values or pixels. In this way an environment of the first image value requiring to be coded can be analyzed and from this a calculation rule established for a location or shape of the trajectories that are to be formed.

For the assignment of the second image value it is furthermore possible to select that second image value that minimizes a distance between the second image value and the trajectory assigned to the third image value. Alternatively hereto the third image value can be generated by a reconstructed image value that results after coding and decoding of the first image value. It is moreover possible to make a change to the third pixel following completion of the formation of the prediction value, the second image value, generated by a reconstruction of the first image value after coding and decoding, then being used for forming the prediction value for a further first image value. What is achieved as a result of this extension of the method is that a second image value of a reconstructed pixel is used as the third image value of the respective trajectory, which second image value represents good prospects for a good determination of the prediction value. What is therefore achieved as a result of the minimization, for example, is that the third image value is assigned that second image value which on the basis of its local location is most similar to the third image value. Known or standardized image or video compression methods for example can be used for coding and decoding, such as e.g. ITU H.263, H.264 or MPEG-2 (ITU—International Telecommunications Union, MPEG—Moving Pictures Expert Group).

In an extension of the method only one trajectory is taken into account for generating the first image value if the distance is equal to zero. In this case the third image value of the considered auxiliary trajectory is assigned to the first image value. The effect of this extension is that in the event that the trajectory comes to lie on the first image value, a good determination for the prediction value is made possible. Furthermore a less complex implementation of the method is made possible as a result of this extension.

In an alternative embodiment variant to the last extension at least two auxiliary trajectories are determined in such a way that the distance between the respective auxiliary trajectory and the position of the first image value constitutes a shortest distance. In this case the prediction value is formed by the third image values of the at least two auxiliary trajectories. In this embodiment variant the prediction value is formed by the third image values of the at least two auxiliary trajectories in such a way that those auxiliary trajectories are taken into account which from the set of all available auxiliary trajectories have the shortest distances. Thus, on the one hand the auxiliary trajectory having the shortest distance is used and in addition the further auxiliary trajectory that has the next shortest distance to the position is taken into consideration.

In a development of this embodiment variant the prediction value is formed by a weighted averaging of the third image values of the at least two auxiliary trajectories. What is achieved hereby is that the prediction value can be estimated with maximum accuracy in respect of the first image value. Furthermore the weighted averaging can take the distances into account as reciprocal values in each case. This is advantageous because the third value of the auxiliary trajectory that is located closer to the first image value is taken into greater account than the third value of a further auxiliary trajectory that is located further away. In general it is also possible to use more than two auxiliary trajectories. In this case a weighted averaging is taken into account that considers more than two selected auxiliary trajectories, for example according to their distances or the reciprocal value of their distances.

Furthermore a new trajectory can be formed in such a way that the new trajectory is arranged on the basis of the position of the first image value, a third value of the new trajectory being assigned the prediction value or the first image value or a reconstructed image value of the first image value.

What is achieved through the use of the new auxiliary trajectory is that a more accurate estimation of the respective first image value is made possible in the formation of a prediction value for further pixels within the image. This is because in addition to the consideration of the formed trajectories, a refined estimation of the prediction value can be achieved based on the new auxiliary trajectory or trajectories. It should be noted that the third image value of the new trajectory can be formed by the prediction value itself, by the first image value or by a reconstructed image value of the first image value.

This extension can be supplemented in that the new trajectory is arranged between two auxiliary trajectories in such a way that at an arbitrary point on the new trajectory a ratio of the shortest distances between the arbitrary point and the two auxiliary trajectories is identical to a ratio of the distances of the two auxiliary trajectories to the first image value. This extension describes a possible location and consequently a possible shape of the new trajectory. It is advantageous in this case that the new location of the new auxiliary trajectory can be determined in a simple manner.

The inventor also proposes a device for forming a prediction value for a first image value of a first pixel of an image on the basis of a second image value of at least one reconstructed pixel of the image, the device comprising the following units:

first unit for forming at least one trajectory that has a third image value in each case, an image value along the respective trajectory corresponding to the respective third image value and the respective trajectory having a shape that is not a straight line;

second unit for assigning the second image value to the respective third image value;

third unit for determining at least one of the trajectories as an auxiliary trajectory that is at a distance from a position of the first image value, the distance constituting a shortest distance to the position;

fourth unit for generating the prediction value on the basis of the third image value of the auxiliary trajectory.

The method can be realized and carried out with the aid of the device. The advantages are analogous to the corresponding method.

The device can additionally have at least one further unit, wherein individual portions of the method of the preceding developments or alternative embodiment variants can be implemented by the further unit. The advantages are analogous to the description of the illustrated embodiment variants.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
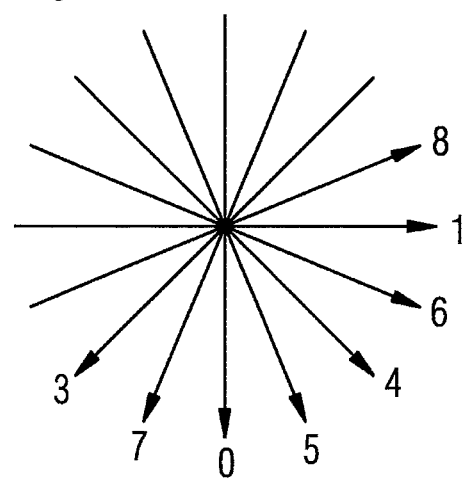
FIG. 1 shows possible prediction directions according to the ITU H.264 standard (related art)

Reference will now be made in detail to the preferred embodiments of the present invention, examples of which are illustrated in the accompanying drawings, wherein like reference numerals refer to like elements throughout.

Figure 2:
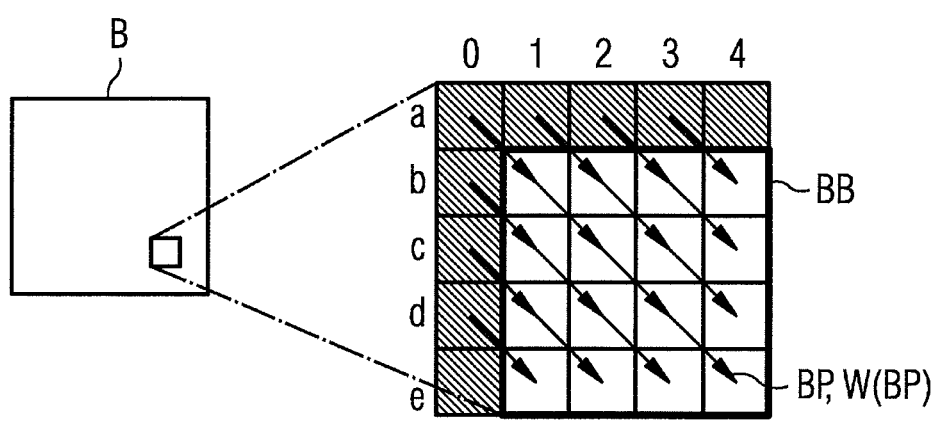
FIG. 2 provides a general description of a procedure for predicting image values of reconstructed pixels.

FIGS. 1 and 2 were explained at length in the introduction, so no further description will be provided at this point.

A first embodiment variant of the proposals is explained in more detail with reference to FIG. 3.

Figure 3:
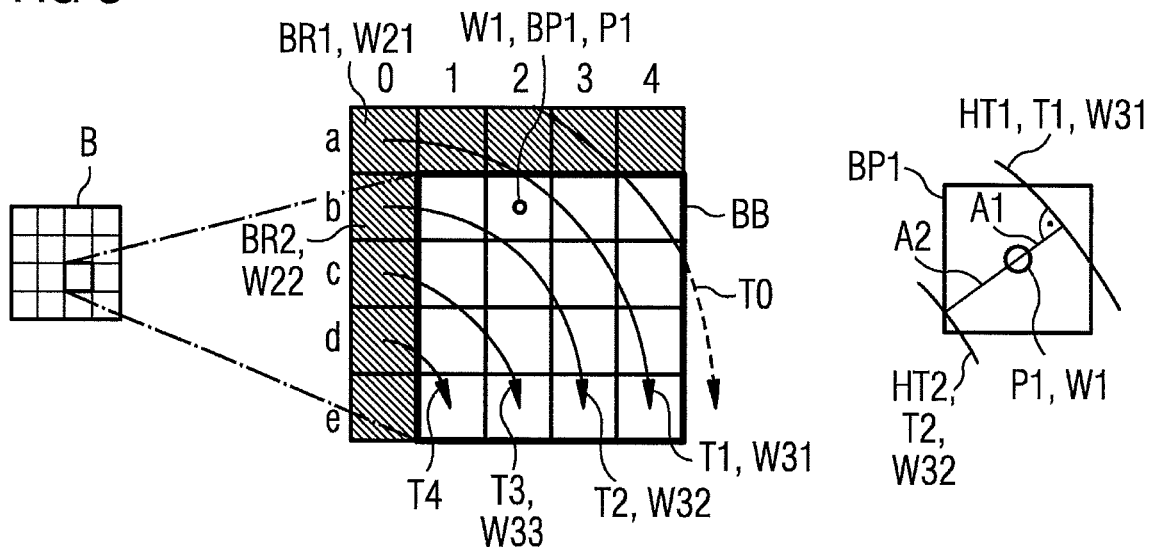
FIG. 3 shows an exemplary embodiment of the proposed method with several trajectories.

FIG. 3 shows an image B made up of 352×288 pixels. Pixels are organized therein into image blocks BB, for example at a size of 4×4 pixels. Each of the pixels has an image value in each case representing a chrominance value and/or a luminance value, for example in the form of an 8-bit resolution. Each square within the image block BB represents a pixel, such as for example a first pixel, BP1 and an associated first image value W1. For this discussion it is assumed that the image value has a position within the pixel designated by the square, for example a point at which diagonals of the square intersect.

FIG. 3 further shows a hatched area containing reconstructed pixels BR1, BR2 and the associated second pixel values W21, W22. The reconstructed pixels were coded at an early point in time and are available in their decoded, i.e. reconstructed form, for the purpose of forming the prediction value.

In a first step at least two trajectories T0, T1, T2, T3, T4 are formed. In the first exemplary embodiment said trajectories are drawn as quadrants and so do not represent a straight line. An image value along the respective trajectory corresponds to a respective third image value W31, W32. In the present exemplary embodiment the respective trajectory starts in the second image value which corresponds exactly to the third image value of the respective trajectory.

In a second step two auxiliary trajectories HT1, HT2 are determined from the set of available trajectories T0, T1, T2, T3, T4 in such a way that a respective distance A1, A2 between the auxiliary trajectory HT1, HT2 that is to be determined and the position P1 of the first image value W1 is minimal, i.e. constitutes a shortest distance in each case. In the present exemplary embodiment the trajectories T1 and T2 are the nearest neighbors to the first pixel, such that HT1=T1 and HT2=T2.

FIG. 3 shows the respective distance A2 of the trajectory T2 from the position T1 and A1 of the trajectory T1 between trajectory T1 and position P1. Since this is the shortest distance, the distance of the respective trajectory forms a 90° angle to the position P1.

In a following step the prediction value PRW is formed by weighted averaging of the third image values W31, W32 of the two auxiliary trajectories HT1=T1, HT2=T2 taking into account the associated distances A1, A2, as follows:

$$PRW(W1) = \frac{\frac{1}{A1} \cdot W31 + \frac{1}{A2} \cdot W32}{\frac{1}{A1} + \frac{1}{A2}} = \frac{A2 \cdot W31 + A1 \cdot W32}{A1 + A2}$$

This approach is known as bilinear interpolation.

Figure 4:
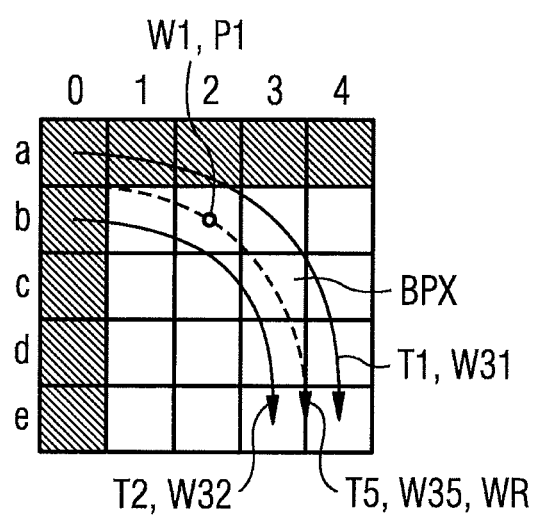
FIG. 4 shows an exemplary embodiment for forming a new trajectory on the basis of two existing trajectories.

An extension of the proposals is described with the aid of FIG. 4. FIG. 4 shows a detail from FIG. 3 with the auxiliary trajectories HT1 and HT2, as well as the first image value W1 and the position P1. First the prediction value is formed, as explained with reference to FIG. 3. The prediction value PRW corresponds to a weighted averaging of the third image values W31, W32 of the trajectories T1, T2. In a further step a new trajectory T5, referred to in the following as T5, is now generated between the existing trajectories T1 and T2. The new trajectory T5 runs at least through the first image value W1 at the position P1. Furthermore the new trajectory T5 can run between the auxiliary trajectories HT1, HT2 in such a way that at an arbitrary point on the new trajectories a ratio of the shortest distances between the arbitrary point and the two auxiliary trajectories is identical to a ratio of the distances A1, A2 in the first image value. A third image value W35 of the new trajectory T5 is equal to the prediction value PRW for the first image value.

In an alternative embodiment variant hereto a reconstructed image value WR can also be determined for the third image value W35 of the new trajectory T5. For that purpose a differential value can first be formed from the first image value W1 and the prediction value PRW to yield

RES(BP1)=W1-PRW

In the following step the differential value is coded in quantized form, for example by a Huffmann coding scheme, decoded and inversely quantized. A plurality of differential values can optionally be transformed in addition prior to the quantization and back-transformed after the inverse quantization. Finally a reconstructed differential value RES'(BP1) results which is different from the differential value RES (BP1). The reconstructed image value WR is then formed into

WR=PRW+RES'(BP1)

This reconstructed image value is used as the third image value W35 of the new trajectory T5 in subsequent formations of a further prediction value, e.g. for BPX, see position c3.

Another exemplary embodiment is explained with reference to FIG. 5. In this case five trajectories T0, T1, T2, T3, T4 are shown, each of the trajectories having a nonlinear shape. The trajectories start in each case in one of the second image values W22 and therefore have the second image value W22 as third image value W32.

In this example the first pixel BP1 is located on position c3. In FIG. 5 the trajectories were constructed in such a way that they lie precisely on a position of the respective image value. In this case only one auxiliary trajectory HT2 is determined, for which the distance A2 is zero. It is of course possible for hybrid shapes to occur in which one or more of the positions do not come to lie on a trajectory or auxiliary trajectory.

In the present case the trajectory T2 is chosen as the auxiliary trajectory HT2, because the distance A2 between the auxiliary trajectory HT2 and the position of the first image value is zero. Thus, the prediction value PRW is equal to the third image value W32 of the trajectory T2, said third image value W32 being equal to the second image value W22 of the reconstructed pixel BR2.

In a third exemplary embodiment a combination of conventional prediction using straight lines and trajectories that are not straight is explained. In the previous examples predefined prediction patterns were presented in some cases with the aid of the trajectories. In the following example an adaptive intra prediction is described. In this case a prediction is performed one step at a time, wherein after a pass through a prediction a prediction direction for a following prediction can be adaptively adjusted.

Figure 5:
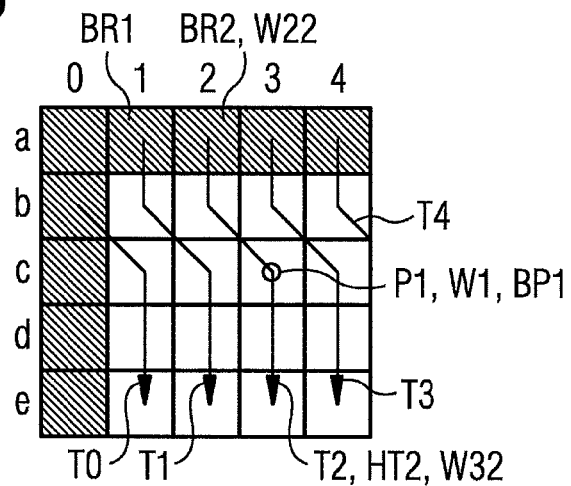
FIG. 5 shows an exemplary embodiment for forming nonlinear trajectories for determining prediction values.

Contrary to the previous representation in FIGS. 3 to 5, a trajectory is now formed by a plurality of arrows which represent a continuous connection. In a first step a first row of first image values (see associated pixels at the positions b1, b2, b3, b4 in the coordinate system) is predicted on the basis of the second image values W21, W22, W23, W24 of the reconstructed pixels PR1, PR2, PR3, PR4 lying directly above.

In a second step a second row of first image values (see first pixels at positions c1, c2, c3, c4 in the coordinate system) is predicted on the basis of a diagonal prediction direction leading from top left to bottom right. This corresponds for example to the prediction direction 4 from FIG. 1. This prediction direction is implemented in the second step also for the first image values having first pixels at the positions d1 and e1.

Figure 6:
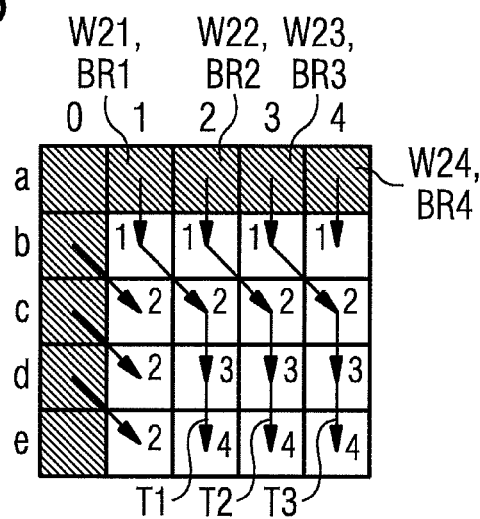
FIG. 6 shows an exemplary embodiment in respect of adaptive nonlinear trajectories for determining prediction values.

In a third and fourth step a downward-directed prediction takes place, marked by the numbers 3 and 4 in FIG. 6.

The trajectory T1 leads from a1, b1, c2, d2 to e2. The trajectories T2 and T3 are formed in an analogous manner thereto.

As already mentioned in the introduction with reference to FIG. 2, a second image value of the reconstructed pixel is used for the prediction in FIG. 6, for example the second image value W21 of the reconstructed pixel BR1 in order to generate a prediction value for a first image value at position e2. Thus, only reconstructed pixels according to the hatched pixels in FIG. 6 are used in this case.

Analogously to the preceding exemplary embodiments, after the prediction value for the first image value has been determined an associated reconstructed image value WR can be determined and used for the following prediction step. For example, a prediction value is determined for the first image value at the position b1. After generation of the associated differential value of the coding and decoding a second image value is generated for the reconstructed pixel at position b1. This second image value is then used for determining a prediction value for the first image value at the position c2, instead of the second image value of the reconstructed pixel from the position a1. This procedure can also be applied analogously for other first pixels requiring to be coded along the respective trajectory. This approach can also find application for other embodiment variants.

Figure 7:
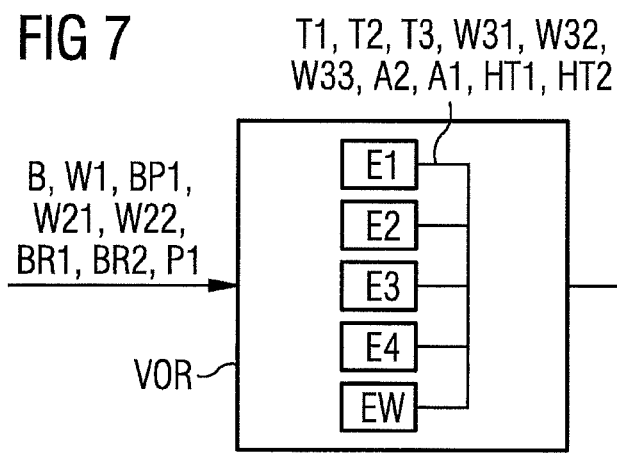
FIG. 7 shows a device for determining a prediction value.

The embodiment variants described can be implemented and executed with the aid of specific devices, see FIG. 7. The devices VOR have units E1, E2, E3, E4, EW which realize and perform individual steps of the embodiment variants. In this case the units can be realized and embodied in software, in hardware and/or in a combination of software and hardware. In such an arrangement the units can run on a processor, in which case individual steps of the method can be stored in a memory and loaded into the processor. The image values, such as the first, second and third image values, and other information relating to the image, as well as further operations for coding and decoding image values can also be stored in the memory.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide V. DIRECTV,* 69 USPQ2d 1865 (Fed. Cir. 2004).

The invention claimed is:

1. A method for forming a prediction value for a first image value of a first pixel of an image on the basis of second image values of respective reconstructed pixels of the image, the method comprising:
    forming at least two trajectories, each trajectory having a third image value for points along the trajectory, each trajectory having a shape that is not a straight line;
    assigning a second image value to each third image value and thereby each trajectory;
    selecting one of the trajectories as an auxiliary trajectory, the auxiliary trajectory being the trajectory at a shortest distance from a position of the first pixel; and
    generating the prediction value based on the third image value of the auxiliary trajectory.

2. The method as claimed in claim 1, wherein
    for assigning the second image value, that second image value is selected either which minimizes a distance between the second image value and the trajectory assigned to the third image value or which corresponds to a reconstructed pixel of the first pixel.

3. The method as claimed in claim 1, wherein
    only one auxiliary trajectory is taken into account for generating the prediction value if the distance from the position of the first pixel is equal to zero, and
    if the distance from the position of the first pixel is equal to zero, the third image value of the auxiliary trajectory is assigned to the first image value.

4. The method as claimed in claim 1, wherein
    at least n plural auxiliary trajectories are selected, the n plural auxiliary trajectories being the trajectories at n shortest distances from the position of the first pixel, and
    the prediction value is generated based on the third image values of the n plural auxiliary trajectories.

5. The method as claimed in claim 4, wherein
    the prediction value is generated using a weighted averaging of the third image values of the n plural auxiliary trajectories.

6. The method as claimed in claim 5, wherein
    the weighted averaging uses reciprocal values of the respective distances of the auxiliary trajectories from the position of the first pixel.

7. The method as claimed in claim 1, wherein a new trajectory is formed in such a way that:
    the first pixel is a point on the new trajectory, and
    the third value of the new trajectory is equivalent to the prediction value or equivalent to an image value for a reconstructed first pixel.

8. The method as claimed in claim 7, wherein
    two auxiliary trajectories are selected, the two auxiliary trajectories being the trajectories at two shortest distances from the position of the first pixel, and
    the new trajectory is arranged between the two auxiliary trajectories in such a way that at an arbitrary point on the new trajectory, a ratio of the shortest distances between the arbitrary point and the two auxiliary trajectories is identical to a ratio of the distances of the two auxiliary trajectories from the position of the first pixel.

9. The method as claimed in claim 1, wherein each second image value is the image value assigned to the reconstructed pixel from which the trajectory extends.

10. A method for forming a prediction value for a first image value of a first pixel of an image on the basis of a second image value of a reconstructed pixel of the image, the method comprising:

forming at least two trajectories each trajectory having a third image value for points along the trajectory, each trajectory having a shape that is not a straight line;

selecting one of the trajectories as an auxiliary trajectory, the auxiliary trajectory being the trajectory at a shortest distance from a position of the first pixel;

assigning the second image value to the third image value of the auxiliary trajectory; and generating the prediction value based on the third image value of the auxiliary trajectory.

11. A device to form a prediction value for a first image value of a first pixel of an image on the basis of second image values of respective reconstructed pixels of the image, the device comprising:

a first unit to form at least two trajectories, each trajectory having a third image value for points along the trajectory, each trajectory having a shape that is not a straight line;

a second unit to assign a second image value to each third image value and thereby each trajectory;

a third unit to select one of the trajectories as an auxiliary trajectory, the auxiliary trajectory being the trajectory at a shortest distance from a position of the first pixel; and a fourth unit to generate the prediction value based on the third image value of the auxiliary trajectory.

12. The device as claimed in claim 11, wherein at least n plural auxiliary trajectories are selected, the n plural auxiliary trajectories being the trajectories at n shortest distances from the position of the first pixel, and the prediction value is generated based on the third image values of the n plural auxiliary trajectories.

* * * * *